United States Patent [19]

Sherman et al.

[11] Patent Number: 4,613,627

[45] Date of Patent: Sep. 23, 1986

[54] PROCESS FOR THE MANUFACTURE OF SHAPED FIBROUS PRODUCTS AND THE RESULTANT PRODUCT

[75] Inventors: Norman Sherman, Ramsey; Timara Underbakke, Roseville, both of Minn.

[73] Assignee: USG Acoustical Products Company, Chicago, Ill.

[21] Appl. No.: 542,472

[22] Filed: Oct. 17, 1983

Related U.S. Application Data

[63] Continuation-in-part of Ser. No. 449,263, Dec. 13, 1982, abandoned.

[51] Int. Cl.⁴ .......................... B32B 5/02; C08J 9/30
[52] U.S. Cl. ..................................... 521/68; 106/122; 264/26; 264/42; 264/45.3; 264/50; 521/84.1; 521/134; 521/138
[58] Field of Search .................... 264/26, 50, 45.3, 42; 521/68, 84.1, 134, 138

[56] References Cited

U.S. PATENT DOCUMENTS

| | | | |
|---|---|---|---|
| 3,025,202 | 3/1962 | Morgan et al. ...................... 156/34 |
| 3,050,427 | 8/1962 | Slayter et al. ...................... 156/26 |
| 3,271,485 | 9/1966 | Canfield ............................. 264/26 |
| 3,320,077 | 5/1967 | Prior . | |
| 3,489,827 | 1/1970 | Mueller et al. ................. 264/45.3 X |
| 3,562,370 | 2/1971 | Shannon ............................. 264/45.3 |
| 3,716,449 | 2/1973 | Gatward et al. . | |
| 3,759,775 | 9/1973 | Shepherd ......................... 264/26 X |
| 3,980,613 | 9/1976 | Bachot et al. ...................... 264/45.3 |
| 4,084,982 | 4/1978 | Prior et al. . | |
| 4,104,435 | 8/1978 | Ballesteros ......................... 428/288 |
| 4,141,744 | 2/1979 | Prior et al. . | |
| 4,187,066 | 2/1980 | Hobson et al. ...................... 425/327 |
| 4,188,355 | 2/1980 | Graham et al. ....................... 264/26 |
| 4,226,911 | 10/1980 | Haren ............................. 264/45.3 X |
| 4,229,406 | 10/1980 | Pollock ........................... 264/45.3 X |
| 4,248,810 | 2/1981 | Erskine ........................... 264/45.3 X |
| 4,320,202 | 3/1982 | Yamamoto et al. ............ 264/45.3 X |
| 4,375,516 | 3/1983 | Barrall ................................. 501/84 |
| 4,447,560 | 5/1984 | Piersol ................................. 521/68 |
| 4,463,039 | 7/1984 | O'Connell et al. ............... 521/68 X |

FOREIGN PATENT DOCUMENTS

| | | |
|---|---|---|
| 800704 | 11/1950 | Fed. Rep. of Germany . |
| 964217 | 3/1957 | Fed. Rep. of Germany . |
| 3129032 | 6/1982 | Fed. Rep. of Germany . |
| 717109 | 10/1954 | United Kingdom . |
| 1131044 | 10/1968 | United Kingdom . |
| 1145045 | 3/1969 | United Kingdom . |
| 1279210 | 6/1972 | United Kingdom . |
| 1329409 | 9/1973 | United Kingdom . |
| 1397308 | 6/1975 | United Kingdom . |
| 1427272 | 3/1976 | United Kingdom . |
| 1544444 | 4/1979 | United Kingdom . |

OTHER PUBLICATIONS (*NASA*, Case No. MSC-14795-1), "Ceramic Fiber Insulating Material and Methods of Producing Same", Patent Application (NASA), 29, p HC, Mar. 8, 1976, 1 Sht Drwg.; 30 pp.

*Mearlcrete*, Technical Bulletin R411D, "Mearlcrete Poured Roof Decks and Insulation," The Mearl Corp., Roselle Park, N.J., (11-69), R411D, 11-69, 8 pp., (A.I.A. file No. 4-E-13, 37-B-2).

Smith, M. K., V. W. Punton and A. G. Rixson, "The Structure and Properties of Paper Formed by a Foaming Process," in *Tappi*, Jan. 1974, vol. 57, No. 1, pp. 107-111.

Rivkind, L. E., "Improved Technology for Rigid Inorganic Foams", reprinted from *Journal of Cellular Plastics*, Jul. 1967, 8 pp.

*Primary Examiner*—Philip Anderson
*Attorney, Agent, or Firm*—Lucas & Just

[57] ABSTRACT

A wet process for the manufacture of shaped fibrous products such as acoustical ceiling board is disclosed. The ceiling board binder is foamed prior to being combined with the solids. Substantial reductions in water requirements are obtained accompanied by substantial energy savings in the drying operation.

89 Claims, 1 Drawing Figure

PROCESS FOR THE MANUFACTURE OF SHAPED FIBROUS PRODUCTS AND THE RESULTANT PRODUCT

This is a continuation-in-part of application Ser. No. 449,263, filed Dec. 13, 1982 and now abandoned.

The present invention relates to the manufacture of shaped products from fibers and a binder. These products are typically acoustical in nature, i.e. they have the ability to attenuate sound. Examples of such shaped products include ceiling panels and tiles, wall boards, screen dividers, construction panels and the like. Since ceiling board, used to make ceiling panels and tiles, is the most preferred application for the products made by the present invention, the invention will be described with reference to ceiling boards.

The manufacture of ceiling board is an old and well-known process. It is typically manufactured by a wet process in a fourdrinier-type machine wherein a slurry of about 3-5% solids is cast on a forming screen. The slurry comprises fibers of either organic or inorganic nature, usually inorganic for fire resistance, together with a binder for the fibers such as starch. The slurry may also include fillers such as newsprint (which also acts as a binder), clay, perlite, and the like. The slurry as cast on the screen is dried by the successive steps of free drainage, suction, press rolls and hot air. Upon entering the drier, the product typically has 60-70% water content, thus requiring a considerable expenditure of energy for drying.

One of the most important functions of most ceiling boards is to act as a sound absorber. Many different techniques have been employed to increase sound absorption, including punching holes, fissuring, striating and the like. The relative noise reduction capability of a product is expressed in terms of noise reduction coefficient. Until the present time, it has been difficult to obtain a commercially viable board having a very high noise reduction coefficient with wet process ceiling panels and this has only been obtainable with dry process ceiling boards such as those made from fiberglass. The many disadvantages of panels made of fiberglass are well known in the art.

The applicants have now discovered a process for forming a ceiling tile or other acoustic product which combines good strength with high noise reduction and relatively low energy requirements. In accordance with the applicants' invention, a modified wet process is employed wherein the binder is foamed separately from the rest of the solid ingredients of the slurry and is then combined with an admixture of the other solids. It has been found that by foaming the binder separately from the other solids content, the total water content of the mat to be cast can be reduced to below 50% of the total weight of the furnish to be cast as compared to the 95-97% normally considered necessary in the known wet process furnishes and in foamed furnishes such as taught in U.S. Pat. No. 3,716,449. With respect to the latter mentioned patent, the present invention not only has advantage in requiring reduced water content but also, at the reduced water content, gets excellent dispersion of the solids content in the foamed binder. A further advantage found in the present invention is that the foamed water allows excellent mixing of the fibers and binder even at low water contents. While it is normally considered necessary to mix the water with fibers at a ratio of about 19:1 or more (i.e. above about 95% water content), the foamed binder of the present invention can be used at levels below 1:1 and even comfortably as low as 3:7 (i.e. 30%-50% water content). This is, of course, of very substantial economic advantage over forming products from a furnish comprising 95% or more of water.

Where reference herein is made to a foamed binder, it is to be appreciated that the liquid portion of the applicants' system may comprise solely water and a foaming agent and the binder may be admixed with the other solids, which solids are then combined with the foamed water. However, it has been found that it is much more advantageous to admix the water and binder, and preferably some other ingredients as discussed hereinafter, before the foaming of the water takes place whereafter the foamed aqueous solution is admixed with the other solids.

The products made according to the process of the present invention are fibrous products. The fibers may be inorganic or organic, natural or synthetic, or combinations of the foregoing. Typical fibers useful in the present invention include organic fibers such as cellulose fibers, wood fibers, polyester fibers, polyamide fibers, and polyolefin fibers; and mineral fibers such as mineral wool, rock wool, slag wool, high aspect ratio wollastonite, kaolin, glass wool, glass fibers and other, known, conventional fibers. For acoustical ceiling board it is preferred that the fibers of the present invention be predominanatly of mineral fiber composition.

The fibers may suitably have an average diameter of from about 1 micron up to about 25 mils but preferably have an average diameter no greater than about 5 mils. While microfibers can be employed, the average length of the fibers is preferably no lower than about 1/64 inch and no greater than about 2 inches, An exception of the latter is that if the fibers are brittle, such as glass fibers, such that they will readily break down during the mixing process, the length can be substantially greater. The fibers preferably have a length to diameter ratio, i.e. aspect ratio, of at least about 10:1. This value 10:1 is considered a high aspect ratio.

Expressed in terms of the total solids content of the furnish composition, the fibers are suitably present in the amount of about 25-95% by weight of the solids content of the furnish. They are preferably present in the amount of about 40-70% by weight.

Another essential solid ingredient in the furnish composition is the binder. The binder may be any material which will function to hold the fibers together. The binder may be organic, inorganic or a combination. Suitable organic binders include starch, and in particular oxidized, ethoxylated starch, and latexes such as polyvinylacetate, vinyl acetate/acrylic copolymers, and styrene-butadiene. Suitable inorganic binders include gypsum, silicates, hydraulic cements such as portland cement and Sorel cements such as magnesium oxychloride.

The binder, expressed in terms of total solids content, may suitably be present in the amount of about 5-75% by weight. With an organic binding system, the binder is preferably present in the amount of about 5-50% by weight and is most preferably present in the amount of about 10-35% by weight. With an inorganic binding system, the binder is preferably present in the amount of about 30-70% by weight and is most preferably present in the amount of about 40-65% by weight.

In an inorganic binding system that hydrates or otherwise takes on water, the binder content is expressed in terms of the finished binding system. For example magnesium oxychloride in its finished, binding form is expressed as magnesium oxide, magnesium chloride and combined water and it is the amount of these compounds present in the finished product which is considered the binder.

The third essential ingredient in the furnish composition is the foaming agent which generates the foam in the aqueous solution. When the aqueous solution is foamed, it forms a foamed component which is subsequently combined with the admixed solids. The foamed component is suitably from about 30% to about 90% gas by volume of the foamed component and, concomitantly, from about 70% to about 10% non-gas. The gas component is typically air while the non-gas component may either be water alone or water with the binder and/or any additional solids other than the fibers. It is preferred that the foam level be about 60–75% by volume of the foamed component.

The foaming agent may be any material capable of achieving the foam level just described. Suitable materials are surfactants. The surfactant may be a non-ionic surfactant but it is preferably a cationic, anionic or amphoteric surfactant. A combination of surfactants can be employed, if desired, except that a combination of an anionic with a cationic will usually destroy foaming properties.

A typical non-ionic surfactant which can be used is octylphenoxy polyethoxyethanol. A suitable cationic surfactant is stearyl trimethyl ammonium chloride such as Adogen 471 which is manufactured by Sherex Chemical Corporation. A suitable anionic surfactant is sodium lauryl sulfate. A suitable amphoteric surfactant is cocoamidobetaine. A preferred amphoteric surfactant is an amine oxide, especially a stearyl amine oxide such as Textamine Oxide from Henkel Corporation.

As stated the amount of foaming agent must be sufficient to achieve the foam level as set forth above. With the surfactant mentioned, this will typically require about 0.1–5% by weight of the solids contents. It is preferred to use about 0.3–3% by weight of solids content and it is most preferred to use about 0.3–1.5%.

It has been found that combining a foam stabilizer with the foaming agent can be of advantage in certain instances, especially if the binder is inorganic. As mentioned, it is preferred that the anionic, cationic or amphoteric surfactants be used as the foaming agent. For use with any one of these surfactants, a non-ionic surfactant has been found to act as an excellent foam stabilizer. The non-ionic surfactant may be the previously mentioned octylphenoxy polyethoxyethanol or an ethoxylated nonyl phenol or other alkyl aryl polyether alcohols or a mixture of the foregoing. A preferred foam stabilizer is Makon 10, a nonyl phenol ether from Stepan Chemical. The foam stabilizer is suitably present at up to about a 1.0% level but is preferably not present in an amount greater than about 0.7%.

The water content is preferably adjusted according to whether the binder system employed is organic or inorganic. Whether the binding system is organic or inorganic, the water content is suitably about 25–70% by weight of the total weight of the furnish composition. Where the binding system is organic, the water content is preferably about 30–60%. Where the binding system is inorganic, the water content is preferably about 30–50% and most preferably about 30–40%. This water content takes into account the water of hydration if it is present with the binder employed.

Where the binding system is organic, it is preferred that one or more binding fillers, such as clay, gypsum or the like be employed. These materials, in addition to being fillers, also have binding qualities. They increase the green strength of the product. In addition, they increase the water resistance of water sensitive binders such as starch. Clay may suitably be present in the amount of up to about 40% by weight of the solids content of the furnish composition, preferably no more than about 30% and most preferably no greater than about 20% by weight of the solids content. Gypsum may suitably be present in the amount of up to about 20% by weight of the solids content but it is preferably present in an amount not greater than about 15% and is most preferably not present in an amount greater than about 10% by weight of the solids content of the furnish.

While not considered cost-justified for most applications, a small amount of polyethylene oxide has been found to be of advantage in some instances. It raises the humidity resistance of the finished product and also acts as a processing aid, both as a foam stabilizer and as a slipperiness-inducing agent, the latter being helpful in hydraulic spreading of the furnish as hereinafter described. Polyethylene oxide may suitably be included at levels up to about 0.5% by weight of the solids content of the furnish but is preferably not present in an amount greater than about 0.3% and it is most preferable to use an amount no more than about 0.1%. Because polyethylene oxide will increase the viscosity of a starch based binder system to quite a high level, the addition of a viscosity reducing agent such as boric acid is preferably used in these systems.

Whether the binding system is organic or inorganic, a silane coupling agent may be advantageously employed. With organic binding systems, and particularly with starch, the silane coupling agent, while expensive, increases humidity resistance substantially even when used at quite small levels. With inorganic binding systems it can substantially increase strength. A suitable silane coupling agent is Dow Corning's Z-6020, an amino silane. The silane coupling agent may suitably be present in the amount of 0.3% by weight of the solids content of the funish, but it is preferably present in the amount of no more than about 0.2% and is most preferably present in an amount of no more than about 0.1%.

It has been found that for good processing it is highly desirable to have the binding system have a minimum viscosity of about 1500 cps before foaming. The 1500 cps measurement is on a Brookfield viscometer operated at 25° C. with spindle #4 rotating at 60 rpm. With an organic binder such as starch, this minimum viscosity will normally be inherently obtained in the binding system. Where an inorganic binding system is employed or where an organic binder is used which does not inherently thicken the binding system, a thickening agent is preferably added in sufficient amount to bring the viscosity of the aqueous solution above about 1500 cps before foaming. Typical thickening agents which can be employed include methyl cellulose, hydroxy propyl cellulose and mixtures of the same such as that sold under the name J75MS by Dow Chemical. The thickening agent is suitably present in the amount of 0.1–0.5% by weight of the solids content of the furnish.

It is also preferable to include a dispersing agent for dispersing the solids in the water of the aqueous solution used to form the foamed binder system. A suitable dispersing agent is sodium hexametaphosphate at a level up to about 1% by weight of the solids content of the furnish.

Where an inorganic binding system is used which includes magnesium oxide, the use of phosphoric acid or other phosphate compounds or combinations of phosphate compounds up to a level of about 1% by weight of the solids content of the furnish is of advantage since it will retard hydrolysis of the magnesium oxide.

Other ingredients may also be present in the furnish such as dyes, pigments, antioxidants, water repellents, fillers, fire retardants, and the like. Suitable fillers include perlite, mica, newsprint, low aspect ratio wollastonite, silica, fly ash, sawdust, vermiculite and the like.

Where an organic binding system is employed, compositions according to the present invention are preferably composed of the following ingredients by weight of solids content:

| mineral fibers | 25-90% |
|---|---|
| starch and/or a latex binder | 5-30% |
| clay | 0-40% |
| gypsum | 0-15% |
| surfactant | 0.5-2% |

It is preferred that clay be present in the amount of at least about 10% and gypsum in the amount of at least about 5%.

Where the binding system is inorganic, compositions according to the present invention are preferably composed of the following ingredients by weight of solids content:

| mineral fibers | 25-70% |
|---|---|
| cement or silicate binder | 30-75% |
| surfactant | 0.5-1.5% |

Under present economic conditions, the mineral fibers are preferably composed of about 2-6% glass fibers with the balance being wollastonite. The composition preferably also includes a thickener sufficient to bring the viscosity above about 1500 cps as discussed hereinbefore.

Having discussed the furnish system according to the present invention, we turn to a discussion of the process, in connection with which reference is made to the FIGURE which is a schematic of a suitable system for carrying out the present invention.

Figure 1:
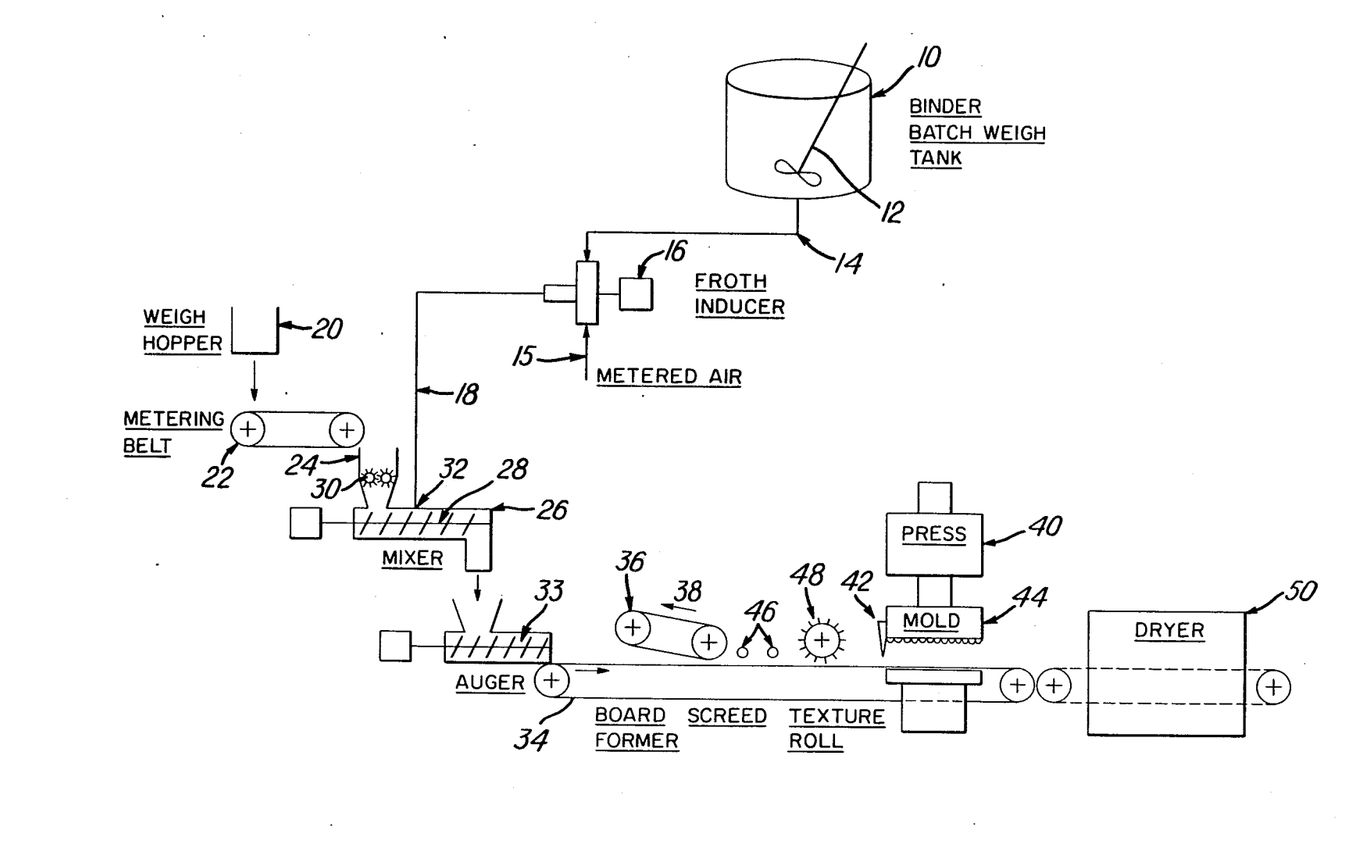

Into vat 10 is placed water. Into this vat 10 is preferably also placed the binder and, if present, the clay, polyethylene oxide, silane coupling agent, dispersing agent, thickening agent and any other ingredients such as dyes, pigments, antioxidants, water repellents, fillers, fire retardants, and the like. The foaming agent is also added to vat 10. It may be added before, with, or after the other ingredients are combined with the water. There can also be included a small portion of the fibers. This is particularly advantageous if there are very short fibers present since associated dusting problems can be eliminated. However, no more than about 10% by weight of the fibers should be added to the mixing vat.

The admixture is thoroughly admixed by mixer 12. Where the binding system is inorganic, it is preferred that the mixing be carried out at high shear. After being admixed the aqueous solution travels through conduit 14 to froth foam inducer 16 which is fed with metered air through airline 15. The foam inducer whips air into the aqueous solution. Froth foam inducer 16 is suitably an Oakes mixer. The foamed component leaves the foam inducer through conduit 18.

At the same time that the foamed component is being prepared, the solids component is being prepared in a separate operation. All solids components not introduced into vat 10, and in particular the fiber component, are fed into a solid feed hopper 20. An appropriate amount is dropped onto feed belt 22 which feeds the solid admixture to a hopper 24 of a mixer 26. The materials on the belt may, if desired, include the clay, gypsum, perlite, and the like. It has been found that if gypsum is used in the system it is preferred to feed it at this point rather than into the binder system. Mixer 26 is suitably a Beardsley & Piper variable throughput mixer and includes a twin auger 28. The admixed solids are initially disrupted and distributed by counter rotating toothed rolls 30 after which they drop into the auger 28 of mixer 26. After travelling in the auger and being admixed therein, the foam component is introduced to the admixed solids in the mixer through conduit 18 at point 32. The solid admixture and the foam component are thoroughly admixed in the mixer to form the furnish. From the mixer the furnish is dropped into auger 33 which deposits the furnish on moving belt 34. The moving belt may be a screen if vacuum drying is desired. However, it has been found that this is not generally necessary in the present invention. The furnish may be deposited on the belt by any known technique such as extrusion or casting, of which casting is preferred. Unless the furnish as deposited is at the proper thickness, which is frequently the case when it is extruded, the deposited furnish first goes under a board-forming belt 36 which moves in the direction of arrow 38. The board-forming belt 36 distributes the furnish to form a flat product on belt 34. Because the furnish is foamed, the entire furnish acts like a hydraulic mass and is easily spread by the board-forming belt 36. The board-forming belt 36 may be a plurality of belts in series, if desired.

After the basic board is formed, it may be subjected to various additional steps. For example, it may be molded such as in press 40 with mold 44 which includes a cutoff knife 42. The mold 44 can have any suitable pattern thereon. Alternatively, or in addition to the pressing, and either before or after pressing, the board may be screeded by rolls 46 and/or texturized with texturizing roll 48. The board may also be coated in standard manner, e.g. with polyvinylacetate.

The board is then set, usually by drying. Drying times and temperatures are dependent on total water content and will vary with the thickness, porosity and density of the board. The board may be suitably dried by passing it directly through the drier 50 wherein the free moisture content is reduced to below about 3%. In the case of a cement-type binder such as magnesium oxychloride, the rate of cure is preferably balanced with the water removal rate. Besides reducing the free moisture content, drying the board in some cases initiates other processes which may inherently take place concurrently with drying depending upon the composition of the binding system. These other processes include: curing, as in the case of a cement-type binder, thermosetting, as in the case of a thermosetting resin-type binder, and crosslinking, as in the case of a crosslinking-type binder.

In the case of a magnesium oxychloride binder the curing is basically a crystallization process, and the board will generally have its best properties with the longest processing time. As a practical matter, this will normally be at ambient temperatures for about 24-48 hours. Where quicker speed is needed for drying an inorganic binding system, it is preferred to use two oven dryings with a radio frequency treatment therebetween, e.g. heating at about 200°-275° F. for about 10-25 minutes followed by radio frequency treatment for about 1 to 2 minutes at a peak power of about 0.5 to about 1 watt per square centimeter, followed by a final heating at about 250°-350° F. for about 1-3 minutes.

The board may then be subjected to such additional steps as trimming, punching, coating and the like, all well known in the art.

While the present invention is particularly suitable for forming board products, it can also be used to form products of varying shapes. The furnish leaving mixer 26 can be molded to any desired shape or can be cast to a shape other than flat, e.g. curved.

These and other aspects of the present invention are illustrated by the following examples.

EXAMPLE 1

12.5 parts by weight (pbw) of Penford 270 gum (a modified starch, namely an ethoxylated, oxidized corn starch produced by Penick & Ford, Ltd.) and 0.5 pbw of sodium tripolyphosphate (STP) were admixed with 102.5 pbw of water to form a binder solution. The STP was included to react with the starch to improve its adhesion to mineral fibers and other inorganic fillers. The binder solution was cooked at boiling to gelatinize and was then cooled to below 120° F.

The following ingredients were then mixed into the binder solution:
5 pbw of a 10% aqueous sodium tripolyphosphate
0.03 pbw Hyamine 2389 (a biocide from Rohm & Haas Corp.)
6.25 pbw Penford 270 starch powder
12.4 pbw gypsum
25 pbw clay
35 pbw fibrous wollastonite
4.0 pbw of a 30% sodium lauryl sulfate dispersion
2.0 pbw of an amine oxide amphoteric surfactant
6.0 pbw of a 5% aqueous borax solution (as a crosslinker for the starch binder)

The binder solution was violently agitated in the presence of air to produce froth foaming by air entrapment during mechanical agitation.

In a separate operation a total of 25 pbw of mineral fibers was weighed out. The foamed binder solution and the fibers were then admixed to form a furnish composition. The furnish composition was vigorously stirred to assure good dispersion.

The furnish composition was then cast in a mold having a perforated bottom and shaped into a product of uniform thickness in a mold. The sides of the mold were removed and the shaped product was partially dried at 250° F. for 45 minutes followed by further drying at 400° F. for an additional 45 minutes. At the end of the drying operation the board had less than 3% by weight of moisture.

The board was cooled to room temperature and was found to have the following physical properties:
Density: 18.1 per cubic foot
Thickness: 0.74 inch
Breaking Load (Instron Universal Tester, flexural mode): 42.0 lbs./3 inch width
Modulus of Rupture: 230 lbs. per square inch The composition of the dried board is as follows:

| ingredients | percent |
| --- | --- |
| modified starch | 15 |
| fibrous wollastonite | 28 |
| mineral fibers | 25 |
| clay | 20 |
| gypsum | 9.46 |
| sodium tripolyphosphate | 0.8 |
| sodium lauryl sulfate | 1 |
| amine oxide | 0.5 |
| borax | 0.24 |

EXAMPLE 2

Example 1 was repeated using starting materials which resulted in the following composition for the dried board:

| ingredients | percent |
| --- | --- |
| modified starch | 15 |
| clay | 20 |
| gypsum | 9.7 |
| mineral fibers | 53 |
| sodium tripolyphosphate | 0.8 |
| sodium lauryl sulfate | 1 |
| amine oxide | 0.5 |

The physical properties of the board were measured and were found to be as follows:
Density: 18.1 pcf
Thickness: 0.77 inch
Breaking Load: 24.0 lbs./3 inch width
Modulus of Rupture: 122 psi

EXAMPLE 3

A board was prepared using the same process as in Example 1 except that a single drying step at 300° F. for 3 hours was used. The board had the following composition:

| ingredients | percent |
| --- | --- |
| modified starch | 10 |
| pearl starch | 4 |
| clay | 36 |
| mineral fibers | 27 |
| fibrous wollastonite | 21.4 |
| amine oxide | 0.7 |
| Adogen 471 (cationic surfactant) | 0.6 |
| sodium hexametaphosphate | 0.3 |

The physical properties of the board were found to be as follows:
Density: 14.1 pcf
Thickness: 0.75 inch
Breaking Load: 26.6 lbs./3 inch width
Modulus of Rupture: 142 psi
Estimated Noise Reduction Coefficient: 0.50

EXAMPLES 4-6

A series of samples was prepared according to the process of Example 1. The composition was varied as to the following:

| Composition | Example | | |
| --- | --- | --- | --- |
| | 4 | 5 | 6 |
| starch | 10 | 10 | 10 |
| mineral fibers | 40 | 41 | 28 |

-continued

| Composition | Example | | |
|---|---|---|---|
| | 4 | 5 | 6 |
| wollastonite | 27 | 39 | 27 |
| gypsum | 23 | 10 | 10 |
| silica | | | 25 |

The density, thickness and ENRC of these boards was found to be as follows:

| Example | Density (pcf) | Thickness (in) | ENRC* |
|---|---|---|---|
| 4 | 17.7 | 0.66 | 0.86 |
| 5 | 18.1 | 0.64 | 0.79 |
| 6 | 21.6 | 0.54 | 0.72 |

*Estimated Noise Reduction Coefficient

EXAMPLE 7

The basic process of Example 1 was repeated except that the drying time was increased due to the water content of the samples being 240 pbw rather than 102.5 pbw. The ingredients of the resulting composition, the drying times and temperatures and the physical properties of the final dried boards are as follows:

| | Example 7A | Example 7B |
|---|---|---|
| ingredients | percent | percent |
| modified starch | 35 | 35 |
| fibrous wollastonite | 20 | 20 |
| mineral fibers | 15 | 15 |
| clay | 18 | 18 |
| gypsum | 9.8 | 10.7 |
| sodium lauryl sulfate | 0.8 | 0.8 |
| amine oxide | 0.5 | 0.5 |
| borax | 0.5 | — |
| sodium hexametaphosphate | 0.4 | — |
| drying temperature | hours | hours |
| 200° F. | — | ¾ |
| 250° F. | 1½ | ¾ |
| 400° F. | 1 | 1 |
| physical properties | | |
| Density (pcf) | 13.8 | 12.0 |
| Thickness (inch) | 0.84 | 0.80 |
| Breaking Load (lbs./ 3 inch width) | 26 | 35 |
| Modulus of Rupture (psi) | 112 | 152 |

EXAMPLE 8

An aqueous solution was prepared by adding to 150 pbw of a cooked starch solution containing 12% starch by weight the following ingredients:

| clay | 20 pbw |
|---|---|
| gypsum | 10 |
| polyethylene oxide | 0.3 |
| sodium lauryl sulfate in 30% aqueous solution | 4.5 |
| boric acid | 1.5 |

The aqueous solution was vigorously stirred.

The aqueous solution was then froth foamed and thereafter 70 pbw of mineral fibers were added to the foamed binder system. The foamed composition was formed into a board. It was dried for four hours at 430° F. The resulting board had the following composition:

| ingredients | percent |
|---|---|
| starch | 15 |
| mineral wool | 56.8 |
| clay | 16.4 |
| gypsum | 9.3 |
| sodium lauryl sulfate | 1.2 |
| boric acid | 1.0 |
| polyethylene oxide | 0.3 |

The resulting board was found to have the following physical characteristics:
Density: 21.8 pcf
Thickness: 0.65 inch
Breaking Load: 23.9 lbs./3 inch width
Modulus of Rupture: 170 psi

EXAMPLE 9

The process of Example 8 was repeated using the starting materials of Example 7 in proportions in the following composition for the dried board:

| ingredients | percent |
|---|---|
| modified starch | 5 |
| fibrous wollastonite | 38 |
| mineral fibers | 25 |
| clay | 20 |
| gypsum | 10.86 |
| sodium lauryl sulfate | 0.5 |
| amine oxide | 0.5 |
| borax | 0.08 |
| sodium hexametaphosphate | 0.06 |

The physical properties of the board were measured and found to be as follows:
Density: 14.1 pcf
Thickness: 0.70 inch
Breaking Load: 9 lbs./3 inch width
Modulus of Rupture: 55 psi

EXAMPLE 10

The process of Example 9 was repeated except that the borax and sodium hexametaphosphate were eliminated. The physical properties of the resulting board were found to be:
Density: 16.9 pcf
Thickness: 0.57 inch
Breaking Load: 9.5 lbs./3 inch width
Modulus of Rupture: 89 psi

EXAMPLE 11

A rapid processing, high performance board can be obtained using the basic process of Example 1 and the following ingredients:

| ingredients | percent |
|---|---|
| modified starch | 10 |
| fibrous wollastonite | 40 |
| mineral wool | 18 |
| clay | 20 |
| gypsum | 10.88 |
| sodium lauryl sulfate | 0.5 |
| sodium hexametaphosphate | 0.12 |
| amine oxide | 0.5 |

Drying was effected by heating for 20 minutes at 170° F. followed by 1 minute of radio frequency at 40 Mhz at about 1 watt per square centimeter and then 39 minutes of heating at 400° F.

The resulting board had the following physical properties:
Density: 16.7 pcf
Thickness: 0.68 inch
Breaking Load: 28 lbs./3 inch width
Modulus of Rupture: 183 psi

EXAMPLE 12

This example demonstrates that latex can be used as the binder. The basic process is as set forth in Example 1. The furnish composition was dried for 2 hours at 300° F. to give a board having the following final composition:

| ingredients | percent |
|---|---|
| Fuller S-6933 latex solids (H. B Fuller Corp.) | 10 |
| mineral fibers | 59.2 |
| clay | 20 |
| gypsum | 9 |
| sodium lauryl sulfate | 1 |
| sodium tripolyphosphate | 0.8 |

The resulting board had the following physical properties:
Density: 19.6 pcf
Thickness: 0.74 inch
Breaking Load: 40.7 lbs./3 inch width
Modulus of Rupture: 223 psi

EXAMPLE 13

Using the same processing conditions as in Example 12, a combination of starch and latex may be used as the binder. A board was prepared which had the following final composition:

| ingredients | percent |
|---|---|
| Amaizo 540 Oxidized starch (American Maize Corp.) | 6 |
| Fuller S-6933 latex solids | 6 |
| mineral fibers | 57.2 |
| clay | 20 |
| gypsum | 9 |
| sodium lauryl sulfate | 1 |
| sodium tripolyphosphate | 0.8 |

Physical properties of this product were found to be as follows:
Density: 19.6 pcf
Thickness: 0.76 inch
Breaking Load: 39.3 lbs./3 inch width
Modulus of Rupture: 204 psi

EXAMPLES 14–20

A series of furnish compositions were prepared using the ingredients as set forth in Table I. In each case, the foaming agent was sodium lauryl sulfate, either alone or together with Textamine Oxide. The latex used was Fuller S-6933 latex. In Example 19, phosphoric acid was used as the catalyst while in Example 20 the catalyst was ammonium dihydrogen phosphate. The foam stabilizer in Example 20 is Ashland's Varamide MA-1. The dispersing agent in Example 19 is sodium hexametaphosphate.

In each case all ingredients present were admixed with water to form an aqueous solution. The aqueous solution was foamed to form a foamed binder system and, thereafter, the mineral fibers were combined with the foamed binder system. The resulting furnish was shaped into a board using the apparatus of the Figure. Drying was carried out at 180° F. for 6 hours, at which point each board was tested for physical properties. The physical properties for each board are set forth in Table II.

TABLE I

| Example # | 14 | 15 | 16 | 17 | 18 | 19 | 20 |
|---|---|---|---|---|---|---|---|
| Ingredients (pbw) | | | | | | | |
| mineral fibers | 24 | 23 | 88 | 38 | 43 | 25 | 87 |
| starch | 75 | 75 | 10 | 50 | 50 | — | — |
| latex | — | — | — | — | — | 66.8 | 10 |
| clay | — | — | — | — | 5 | — | — |
| gypsum | — | — | — | 10 | — | — | — |
| foaming agent | 1 | 2 | 2 | 2 | 2 | 2 | 2 |
| catalyst | — | — | — | — | — | 0.2 | 0.3 |
| foam stabilizer | — | — | — | — | — | — | 0.7 |
| dispersing agent | — | — | — | — | — | 6 | — |

TABLE II

| Example | Density[1] | Thickness[2] | Breaking Load[3] | MOR[4] |
|---|---|---|---|---|
| 14 | 22.4 | 0.62 | 16.6 | 130 |
| 15 | 16.9 | 0.50 | 8.6 | 103 |
| 16 | 17.9 | 0.63 | 6.0 | 45 |
| 17 | 11.2 | 0.64 | 4.0 | -29 |
| 18 | 9.0 | 0.57 | 13.7 | 83 |
| 19 | 15.6 | 0.54 | 30.5 | 313 |
| 20 | 9.7 | 0.75 | 3.5 | 19 |

Footnotes
[1] in pounds per cubic foot
[2] in inches
[3] in pounds per 3 inch strip
[4] modulus of rupture in pounds per square inch The foregoing Examples 1–20 are primarily directed towards the process of the present invention with an organic binding system. The following examples illustrate the process of the invention with an inorganic binding system.

EXAMPLE 21

The following ingredients were combined under high shear mixing to form a binder system:
3.4% magnesium chloride as a 35% solution
0.6% J-75MS (a mixture of methyl cellulose and hydroxy propyl cellulose) as a 2% solution
0.6% sodium lauryl sulfate as a 30% solution
44.0% water
7.2% magnesium oxide The system was froth foamed and 44.2% mineral fibers were subsequently admixed with the foam and shaped into a board as described in Example 1. A board was formed and allowed to cure at room temperature for 21 hours. The board was then dried for 4 hours at 200°–220° F. The composition of the resulting board was as follows:

| ingredients | percent |
|---|---|
| mineral fibers | 74.4 |
| magnesium oxide | 12.1 |
| combined water* | 5.8 |
| magnesium chloride | 5.7 |
| hydroxy propyl cellulose/ methyl cellulose | 1 |
| sodium lauryl sulfate | 1 |

*As used herein the term "combined water" refers to the measured weight of water in the dried sample. It is believed that all of the combined water is present as water of hydration.

The following physical properties were found for this board:
Density: 19.8 pcf
Thickness: 0.60 inch
Breaking Load: 7.42 lbs./3 inch width
Modulus of Rupture: 62.6 psi

EXAMPLE 22

The process of Example 21 was used except that the following ingredients were substituted:
4.6% magnesium chloride added in the form of hexahydrate flake
0.8% hydroxy propyl cellulose/methyl cellulose
0.4% sodium lauryl sulfate as a 30% solution
4.8% water
9.9% magnesium oxide The system was froth foamed and 39.5% mineral fibers were subsequently admixed with the foam. A board was formed and was allowed to cure at room temperature for 3 days. The composition of the cured board was as follows:

| ingredients | percent |
|---|---|
| mineral fibers | 59 |
| combined water | 17.5 |
| magnesium oxide | 15 |
| magnesium chloride | 7 |
| hydroxy propyl cellulose/methyl cellulose | 1 |
| sodium lauryl sulfate | 0.5 |

The following physical properties were measured:
Density: 13.2 pcf
Thickness: 0.72 inch
Breaking Load: 9.7 lbs./3 inch width
Modulus of Rupture: 58 psi

EXAMPLE 23

The following ingredients were combined under high shear mixing to form a binder system:
9.8% magnesium chloride as a 35% solution
0.4% J-75MS as a 2% solution
0.9% sodium lauryl sulfate as a 30% solution
46.5% water
20.7% magnesium oxide The system was froth foamed and 21.7% mineral fibers were subsequently admixed with the foam and shaped into a board. A board was formed and allowed to cure at room temperature for 19 hours. The board was then dried for 4 hours at 200°–220° F. The composition of the resulting board was as follows:

| ingredients | percent |
|---|---|
| mineral fibers | 32.8 |
| magnesium oxide | 31.2 |
| combined water | 19.4 |
| magnesium chloride | 14.7 |
| sodium lauryl sulfate | 1.3 |
| hydroxy propyl cellulose/methyl cellulose | 0.6 |

The following physical properties were found for the board:
Density: 18.2 pcf
Thickness: 0.59 inch
Breaking Load: 25 lbs./3 inch width
Modulus of Rupture: 215 psi

EXAMPLE 24

The following ingredients were combined under high shear mixing to form a binder system:
11.9% magnesium chloride as a 35% solution
31.7% water
0.5% amine oxide as a 30% solution
0.8% alkyl phenol ether (Makon 10 from Stepan Chemicals)
24.8% magnesium oxide The system was froth foamed and 25.5% fibrous wollastonite and 4.8% ¼" glass fibers added as 85% glass in water subsequently were mixed with the foam and shaped into a board. The board was processed in a drying oven for 10 minutes at 140° F. and 15 minutes at 200°–230° F. It was then processed for 1 minute in a radio frequency oven at about 40 Mhz at a peak power density of about 1 watt per square centimeter and thereafter for 4 minutes at 300°–330° F. in a drying oven. The board's final composition was:

| ingredients | percent |
|---|---|
| fibrous wollastonite | 33.9 |
| magnesium oxide | 32.9 |
| magnesium chloride | 15.8 |
| combined water | 9.4 |
| ¼" glass fiber | 6.6 |
| alkyl phenol ether | 0.8 |
| amine oxide | 0.6 |

The following physical properties were observed:
Density: 21.8 pcf
Thickness: 0.52 inch
Breaking Load: 8 lbs./3 inch width
Modulus of Rupture: 89 psi

EXAMPLE 25

The following ingredients were combined under high shear mixing to form a binder system:
7.8% magnesium chloride as a 35% solution
37.9% water
0.5% amine oxide as a 30% solution
0.2% Makon 10
13.2% magnesium oxide The system was froth foamed and 12.4% low aspect ratio wollastonite, 23.3% high aspect ratio fibrous wollastonite, 1.9% slag wool and 2.8% ¼" glass fibers were mixed with the foam. A board was formed and was processed at room temperature for 48 hours. The final compositon was:

| ingredients | | percent |
|---|---|---|
| fibrous wollastonite | | 46 |
| high aspect ratio | 30% | |
| low aspect ratio | 16% | |
| slag wool | | 2.4 |
| ¼" glass fibers | | 3.6 |
| magnesium oxide | | 17.0 |
| magnesium chloride | | 10 |
| combined water | | 20.1 |
| alkyl phenol ether | | 0.3 |
| amine oxide | | 0.6 |

The following physical properties were found for the board:
Density: 18.0 pcf
Thickness: 0.72 inch
Breaking Load: 45 lbs./3 inch width Modulus of Rupture 260 psi

EXAMPLE 26

The following ingredients were combined under high shear to form a binder system:
8.0% magnesium chloride as a 35% solution
36.5% water
0.3% sodium hexametaphosphate
0.3% sodium lauryl sulfate as a 30% solution
0.3% amine oxide as a 30% solution
0.2% Makon 10
13.5% magnesium oxide The system was froth foamed and 18.5% low aspect ratio wollastonite, 18.5% high aspect ratio fibrous wollastonite, 1.0% slag wool and 2.9% ¼" glass fibers were mixed with the foam. A board was formed and processed for 24 hours at room temperature. Its final composition was:

| ingredients | | percent |
| --- | --- | --- |
| fibrous wollastonite | | 46.0 |
| high aspect ratio | 23% | |
| low aspect ratio | 23% | |
| slag wool | | 1.2 |
| ¼" glass fibers | | 3.6 |
| magnesium oxide | | 17 |
| magnesium chloride | | 10 |
| combined water | | 20.8 |
| sodium hexametaphosphate | | 0.4 |
| sodium lauryl sulfate | | 0.4 |
| amine oxide | | 0.4 |
| alkyl phenol ether | | 0.2 |

The physical properties of the resulting board were:
Density: 17.1 pcf
Thickness: 0.70 inch
Breaking Load: 30.5 lbs./3 inch width
Modulus of Rupture: 187 psi

EXAMPLE 27

The following ingredients were combined under high shear mixing to form a binder system:
10.5% magnesium chloride as a 35% solution
37.5% water
0.2% sodium hexametaphosphate
0.1% J-75MS as a 2% solution
0.4% amine oxide as a 30% solution
0.4% Makon 10
21.0% magnesium oxide The system was froth foamed and 25.8% high aspect ratio fibrous wollastonite and 4.1% ¼" glass fibers were mixed with the foam. A board was formed and processed as follows: 1 hour at ambient temperature, ½ hour at 250° F., 1 hour at ambient temperature, ½ hour at 250° F. The final composition of the board was as follows:

| ingredients | percent |
| --- | --- |
| high aspect ratio fibrous wollastonite | 35 |
| ¼" glass fibers | 5.6 |
| magnesium oxide | 28.5 |
| magnesium chloride | 14.2 |
| combined water | 15.1 |
| amine oxide | 0.6 |
| alkyl phenol ether | 0.5 |
| sodium hexametaphosphate | 0.3 |
| hydroxy propyl cellulose/ methyl cellulose | 0.2 |

The physical properties of the resulting board were:
Density: 18.1 pcf
Thickness: 0.50 inch
Breaking Load: 19.3 lbs./3 inch width
Modulus of Rupture: 232 psi

EXAMPLE 28

The following ingredients were combined with high shear mixing:
0.2% sodium hexametaphosphate as a 10% solution
0.1% J-75MS as a 2% solution
11.5% magnesium chloride as a 35% solution
33.07% water
0.4% Textamine Oxide as a 30% solution
0.4% Makon 10
0.03% Z-6020 silane solution
23.9% magnesium oxide The system was froth foamed and 26.2% high aspect ratio fibrous wollastonite and 4.2% ¼" glass fibers were mixed with the foam. Two boards were formed and processed under different conditions. The processing conditions, resulting board composition and physical properties were as follows:

| | Example 28A | Example 28B |
| --- | --- | --- |
| Processing Conditions | | |
| Minutes at 200° F. | 15 | 25 |
| Minutes at 40 Mhz | 1 | 1 |
| Minutes at 330° F. | 1 | — |
| Minutes at 260° F. | — | 4 |
| Resulting Board Compositions (percent) | | |
| fibrous wollastonite | 34 | 34 |
| ¼" glass fibers | 5 | 5 |
| magnesium oxide | 31 | 31 |
| magnesium chloride | 15 | 15 |
| combined water | 13.35 | 13.35 |
| amine oxide | 0.6 | 0.6 |
| alkyl phenol ether | 0.5 | 0.5 |
| sodium hexametaphosphate | 0.3 | 0.3 |
| hydroxy propyl cellulose/ methyl cellulose | 0.2 | 0.2 |
| amino silane | 0.05 | 0.05 |
| Physical properties | | |
| Density (pcf) | 20.6 | 19 |
| Thickness (inch) | 0.62 | 0.6 |
| Breaking Load (lbs./3 inch) | 24.2 | 24.8 |
| Modulus of Rupture (psi) | 191 | 204 |

EXAMPLE 29

The following ingredients were combined under high shear mixing to form a binder system:
9.9% magnesium chloride as a 35% solution
33.1% water
0.2% sodium hexametaphosphate
0.2% J-75MS as a 2% solution
0.5% Textamine Oxide as a 30% solution
0.4% Makon 10
20.6% magnesium oxide The system was froth foamed and 14.5% low aspect ratio wollastonite, 14.5% high aspect ratio fibrous wollastonite and 6.1% ¼" glass fibers were mixed with the foam. A board was formed and was processed for 40 minutes at 250° F. The resulting composition was as follows:

| ingredients | percent |
| --- | --- |
| fibrous wollastonite | 38 |

| ingredients | percent |
| --- | --- |
| high aspect ratio 19% | |
| low aspect ratio 19% | |
| ¼" glass fibers | 8 |
| magnesium chloride | 13 |
| magnesium oxide | 27 |
| combined water | 12.4 |
| amine oxide | 0.6 |
| alkyl phenol ether | 0.5 |
| sodium hexametaphosphate | 0.3 |
| hydroxy propyl cellulose/ methyl cellulose | 0.2 |

The physical properties of the board were measured at:
Density: 13.2 pcf
Thickness: 0.67 inch
Breaking Load: 15.8 lbs./3 inch width
Modulus of Rupture: 107 psi

EXAMPLE 30

The following ingredients were combined under high shear mixing to form a binder system:
11.7% magnesium chloride as a 35% solution
3.11% water
0.2% sodium hexametaphosphate
0.2% J-75MS as a 2% solution
0.04% Z-6020 silane
24.4% magnesium oxide
0.4% amine oxide
0.35% alkyl phenol ether The system was froth foamed and 25% high aspect ratio fibrous wollastonite and 4.6% ¼" glass fibers were mixed with the foam. A board was formed and processed for 25 minutes: 5 minutes at 140° F., 15 minutes at 200°–250° F., 1 minute radio frequency and 4 minutes at 200°–250° F. The final composition of the board was:

| ingredients | percent |
| --- | --- |
| high aspect ratio fibrous wollastonite | 31.3 |
| ¼" glass fibers | 5.8 |
| magnesium oxide | 30.5 |
| magnesium chloride | 14.6 |
| combined water | 16.15 |
| amine oxide | 0.6 |
| alkyl phenol ether | 0.5 |
| sodium hexametaphosphate | 0.3 |
| hydroxy propyl cellulose/ methyl cellulose | 0.2 |
| amino silane | 0.05 |

The physical properties of the board were measured as:
Density: 18.6 pcf
Thickness: 0.66 inch
Breaking Load: 28 lbs./3 inch width
Modulus of Rupture 193 psi

EXAMPLE 31

The following ingredients were combined under high shear mixing to form a binder system:
10.6% magnesium chloride as a 35% solution
35.36% water
0.2% sodium hexametaphosphate
0.04% Z-6020 silane
0.4% Textamine Oxide as a 30% solution
0.4% Makon 10
19.7% magnesium oxide The system was froth foamed and 9.8% low aspect ratio wollastonite, 19.7% high aspect ratio fibrous wollastonite and 3.8% ¼" glass fibers were mixed with the foam. A board was formed and was processed for 42 minutes: 26 minutes at 100°–140° F., 10 minutes at 200° F., 1 minute of radio frequency, and 5 minutes at 300° F. The final composition of the board was as follows:

| ingredients | percent |
| --- | --- |
| fibrous wollastonite | 39 |
| high aspect ratio 26% | |
| low aspect ratio 13% | |
| ¼" glass fibers | 5 |
| magnesium oxide | 26 |
| magnesium chloride | 14 |
| combined water | 14.65 |
| amine oxide | 0.6 |
| alkyl phenol ether | 0.5 |
| sodium hexametaphosphate | 0.2 |
| amino silane | 0.05 |

The physical properties of the board were measured as:
Density: 20.4 pcf
Thickness: 0.62 inch
Breaking Load: 36 lbs./3 inch width
Modulus of Rupture: 281 psi

EXAMPLE 32

The following ingredients were combined under high shear mixing to form a binder system:
0.3% hydroxy propyl cellulose/methyl cellulose
7.7% magnesium chloride added in the form of hexahydrate flake
42.2% water
16.5% magnesium oxide
0.3% sodium lauryl sulfate as a 30% solution The system was froth foamed and 33.0% slag wool was subsequently admixed with the foam. A board was formed and was allowed to cure at room temperature for 11 days. The cured board had the following composition:

| ingredients | percent |
| --- | --- |
| slag wool fibers | 43 |
| combined water | 25.2 |
| magnesium oxide | 21 |
| magnesium chloride | 10 |
| hydroxy propyl cellulose/ methyl cellulose | 0.4 |
| sodium lauryl sulfate | 0.4 |

The following physical properties were measured:
Density: 34.6 pcf
Thickness: 0.72 inch
Breaking Load: 44.0 lbs./3 inch width
Modulus of Rupture: 261 psi

EXAMPLE 33

The following ingredients were combined under high shear mixing to form a binder system:
0.3% sodium added in the form of hexametaphosphate
0.1% hydroxy propyl cellulose/methyl cellulose
6.7% magnesium chloride added in the form of hexahydrate flake
0.3% sodium lauryl sulfate as a 30% solution 0.2% Makon 10
38.26% water
14.9% magnesium oxide
0.04% polyethylene oxide The system was froth foamed and 3.6% fibrous wollastonite and 35.6% slag wool were subsequently admixed with the foam and shaped into a board. The board was cured for one day at room temperature. The composition of the resulting board was as follows:

| ingredients | percent |
|---|---|
| fibrous wollastonite | 4.6 |
| slag wool | 46 |
| magnesium oxide | 19 |
| magnesium chloride | 8.5 |
| combined water | 20.65 |
| sodium hexametaphosphate | 0.4 |
| sodium lauryl sulfate | 0.3 |
| alkyl phenol ether | 0.3 |
| hydroxy propyl cellulose/methyl cellulose | 0.2 |
| polyethylene oxide | 0.05 |

The following physical properties were found for the board:
Density: 17.8 pcf
Thickness: 0.73 inch
Breaking Load: 21.3 lbs./3 inch width
Modulus of Rupture: 124 psi

EXAMPLE 34

The following ingredients were combined under high shear mixing to form a binder system:
7.6% magnesium chloride added in the form of hexahydrate flake
0.3% hydroxyl propyl cellulose/methyl cellulose
0.3% sodium lauryl sulfate as a 30% solution
42.2% water
16.5% magnesium oxide The system was froth foamed and thereafter admixed with 16.5% slag wool and 16.5% 1" glass fiber. A board was formed and allowed to cure at room temperature for 7 days. The board had a final composition as follows:

| ingredients | percent |
|---|---|
| combined water | 24.7 |
| slag wool | 21.5 |
| 1" glass fiber | 21.5 |
| magnesium oxide | 21.5 |
| magnesium chloride | 10 |
| hydroxy propyl cellulose/methyl cellulose | 0.4 |
| sodium lauryl sulfate | 0.4 |

The physical properties of the board were as follows:
Density: 36.2 pcf
Thickness: 0.71 inch
Breaking Load: 75 lbs./3 inch width
Modulus of Rupture: 456 psi

EXAMPLE 35

The following ingredients were combined under high shear mixing to form a binder system:
0.3% sodium hexametaphosphate
0.5% phosphoric acid as an 85% solution
0.2% hydroxy propyl cellulose/methyl cellulose
10.1% magnesium chloride added in the form of hexahydrate flake
36.7% water
27.4% magnesium oxide
0.4% sodium lauryl sulfate as a 30% solution The system was froth foamed and subsequently combined with 12.2% slag wool and 12.2% ½" glass fibers. A board was formed and as allowed to cure at room temperature for days. The board had a final composition of:

| ingredients | percent |
|---|---|
| magnesium oxide | 31 |
| combined water | 28.3 |
| slag wool | 14 |
| ½" glass fibers | 14 |
| magnesium chloride | 11 |
| phosphoric acid | 0.6 |
| sodium lauryl sulfate | 0.5 |
| sodium hexametaphosphate | 0.3 |
| hydroxy propyl cellulose/methyl cellulose | 0.3 |

The board was found to have the following physical properties:
Density: 32.9 pcf
Thickness: 0.70 inch
Breaking Load: 69 lbs./3 inch width
Modulus of Rupture: 442 psi

EXAMPLE 36

The following ingredients were combined under high shear mixing to form a binder system:
4.3% magnesium chloride as a 35% solution
0.4% sodium hexametaphosphate
0.14% hydroxy propyl cellulose/methyl cellulose
0.05% polyethylene oxide
39.61% water
9.2% magnesium oxide
0.2% sodium lauryl sulfate as a 30% solution
0.2% Makon 10

The system was froth foamed and 18.4% high aspect ratio fibrous wollastonite and 27.5% slag wool were mixed into the foam. A board was formed and allowed to cure for 3 days at room temperature. The final composition of the board was:

| ingredients | percent |
|---|---|
| slag wool | 39 |
| high aspect ratio fibrous wollastonite | 26 |
| combined water | 14.59 |
| magnesium oxide | 13 |
| magnesium chloride | 6 |
| sodium hexametaphosphate | 0.55 |
| sodium lauryl sulfate | 0.3 |
| alkyl phenol ether | 0.3 |
| hydroxy propyl cellulose/methyl cellulose | 0.2 |
| polyethylene oxide | 0.06 |

The following physical properties were found for the finished board:
Density: 14.0 pcf
Thickness: 0.73 inch
Breaking Load: 9.4 lbs./3 inch width
Modulus of Rupture: 53 psi

EXAMPLE 37

The following ingredients were combined under high shear mixing to form a binder system:

0.5% sodium hexametaphosphate
0.06% hydroxy propyl cellulose/methyl cellulose as a 2% solution
10.4% magnesium chloride as a 35% solution
34.34% water
21.6% magnesium oxide
0.05% polyethylene oxide
0.3% sodium lauryl sulfate as a 30% solution
0.3% Makon 10
0.05% amine oxide as a 30% solution The system was froth foamed and it was subsequently combined with 5.4% fibrous wollastonite and 27.0% mineral fibers. A board was formed and processed with an infrared heat lamp for 40 minutes. The final composition of the board was:

| ingredients | percent |
| --- | --- |
| mineral fibers | 30.9 |
| fibrous wollastonite | 6.2 |
| magnesium oxide | 24.7 |
| magnesium chloride | 11.9 |
| combined water | 24.91 |
| sodium hexametaphosphate | 0.5 |
| alkyl phenol ether | 0.4 |
| sodium lauryl sulfate | 0.3 |
| hydroxy propyl cellulose/methyl cellulose | 0.07 |
| polyethylene oxide | 0.06 |
| amine oxide | 0.06 |

The board was found to have the following physical properties:
Density: 22.9 pcf
Thickness. 0.79 inch
Breaking Load: 23.7 lbs./3 inch width
Modulus of Rupture: 115 psi

EXAMPLE 38

The following ingredients were combined under high shear mixing to form a binder system:
0.4% sodium hexametaphosphate
0.1% hydroxy propyl cellulose/methyl cellulose as a 2% solution
8.5% magnesium chloride added in the form of hexahydrate flake
44.05% water
19.1% magnesium oxide
0.05% polyethylene oxide
0.3% Adogen 471 (a cationic surfactant) as a 50% solution
0.2% Makon 10

The system was froth foamed and was then admixed with 4.6% fibrous wollastonite and 22.7% mineral wool. A board was formed and cured for one day at room temperature. The board had the following composition:

| ingredients | percent |
| --- | --- |
| mineral wool | 29 |
| combined water | 27.66 |
| magnesium oxide | 25 |
| magnesium chloride | 11 |
| fibrous wollastonite | 6 |
| sodium hexametaphosphate | 0.5 |
| stearyl trimethyl ammonium chloride | 0.4 |
| alkyl phenol ether | 0.2 |
| hydroxy propyl cellulose/methyl cellulose | 0.18 |
| polyethylene oxide | 0.06 |

The physical properties of the resulting board were as follows:
Density: 15.7 pcf
Thickness: 0.79 inch
Breaking Load: 23.5 lbs./3 inch width
Modulus of Rupture: 110 psi

EXAMPLE 39

A board was prepared exactly as in Example 38, except that the Adogen 471 was replaced with 0.2% sodium lauryl sulfate and the initial water content was increased to 44.15%. The physical properties of the resulting product were as follows:
Density: 20.9 pcf
Thickness: 0.70 inch
Breaking Load: 32.2 lbs./3 inch width
Modulus of Rupture: 200 psi

EXAMPLE 40

A board was prepared exactly as in Example 39 except that the sodium lauryl sulfate was replaced with a surfactant blend, Duponal XL. The board had the following physical properties:
Density. 21.5 pcf
Thickness: 0.75 inch
Breaking Load: 41.4 lbs./3 inch width
Modulus of Rupture: 227 psi

EXAMPLE 41

A board was prepared exactly as in Example 38 except that it was processed for 2.7 hours at 225° F. The board was found to have the following physical properties:
Density: 21.6 pcf
Thickness: 0.83 inch
Breaking Load: 30.6 lbs./3 inch width
Modulus of Rupture: 135 psi

EXAMPLE 42

A board was prepared exactly as in Example 38 except that it was processed for 25 minutes at 180°–220° F., followed by 55 minutes at 220°–380° F. The physical properties of the resulting board were found to be as follows:
Density: 17.3 pcf
Thickness: 0.73 inch
Breaking Load: 18.6 lbs./3 inch width
Modulus of Rupture: 110 psi

EXAMPLE 43

A board was prepared exactly as in Example 39 except that it was processed by passing room temperature air through the board for 50 minutes followed by heating for 60 minutes at 140° F. The board was found to have the following physical properties:
Density: 23.2 pcf
Thickness: 0.71 inch
Breaking Load: 31.4 lbs./3 inch width
Modulus of Rupture: 188 psi

EXAMPLE 44

A board was prepared exactly as in Example 39 except that it was processed for 70 minutes at 165° F. The board had the following measured physical properties:
Density:, 17.1 pcf
Thickness: 0.83 inch
Breaking Load: 22.0 lbs./3 inch width
Modulus of Rupture: 97 psi

EXAMPLE 45

A board was prepared exactly as in Example 39 except that it was processed for 22 hours at 110°–118° F. The following physical properties were found for this board:
Density: 21.4 pcf
Thickness: 0.70 inch
Breaking Load: 35.5 lbs./3 inch width
Modulus of Rupture: 190 psi

EXAMPLE 46

A board was prepared exactly as in Example 39 except that it was processed for 70 minutes at 90° F. followed by 90 minutes at 115° F. and then by 29 minutes at 225° F. The measured physical properties of the board were as follows:
Density: 19.0 pcf
Thickness: 0.83 inch
Breaking Load: 29.5 lbs./3 inch width
Modulus of Rupture: 130 psi

EXAMPLE 47

The following ingredients were combined to form a binder system:
0.5% sodium hexametaphosphate
0.05% hydroxy propyl cellulose/methyl cellulose
10.1% magnesium chloride added in the form of hexahydrate flake
34.88% water
0.05% polyethylene oxide
21.5% magnesium oxide
0.3% sodium lauryl sulfate as a 30% solution
0.3% Makon 10
0.02% amine oxide as a 30% solution The system was froth foamed and was thereafter admixed with 21.5% fibrous wollastonite and 10.8% slag wool. A board was formed and processed for 40 minutes at 180° F. The board had a final composition of:

| ingredients | percent |
| --- | --- |
| fibrous wollastonite | 24 |
| slag wool | 12 |
| magnesium oxide | 24 |
| magnesium chloride | 11 |
| combined water | 27.66 |
| sodium hexametaphosphate | 0.5 |
| alkyl phenol ether | 0.4 |
| sodium lauryl sulfate | 0.3 |
| hydroxy propyl cellulose/methyl cellulose | 0.06 |
| polyethylene oxide | 0.06 |
| amine oxide | 0.02 |

The physical properties of the resulting board were found to be as follows:
Density: 17.4 pcf
Thickness: 0.88 inch
Breaking Load: 20.8 lbs./3 inch width
Modulus of Rupture: 80 psi

EXAMPLE 48

A board was prepared exactly as in Example 47 except that it was cured for 24 hours at room temperature. The physical properties of the resulting board were as follows:
Density: 19.5 pcf
Thickness: 0.77 inch
Breaking Load: 24.7 lbs./3 inch width
Modulus of Rupture: 125 psi

EXAMPLE 49

Another board was prepared exactly as in Example 47 except that it was cured for 3 hours at room temperature followed by 20 minutes at 260° F. The physical properties of the board were as follows:
Density: 19.5 pcf
Thickness: 0.64 inch
Breaking Load: 19.3 lbs./3 inch width
Modulus of Rupture: 140 psi

EXAMPLE 50

The following ingredients were combined to form a binder system:
0.5% sodium hexametaphosphate
34.29% water
0.06% hydroxy propyl cellulose/methyl cellulose
10.6% magnesium chloride as a 35% solution
0.05% polyethylene oxide
21.6% magnesium oxide
0.2% sodium lauryl sulfate as a 30% solution
0.2% Makon 10
0.2% amine oxide as a 30% solution The system was froth foamed and thereafter 32.3% high aspect ratio fibrous wollastonite was admixed with the foam. A board was formed and cured at room temperature for two days. The final composition of the board was:

| ingredients | percent |
| --- | --- |
| high aspect ratio fibrous wollastonite | 34.5 |
| combined water | 28.76 |
| magnesium oxide | 24 |
| magnesium chloride | 11.6 |
| sodium hexametaphosphate | 0.5 |
| sodium lauryl sulfate | 0.3 |
| alkyl phenol ether | 0.2 |
| hydroxy propyl cellulose/methyl cellulose | 0.06 |
| polyethylene oxide | 0.06 |
| amine oxide | 0.02 |

The following physical properties were found for the cured board:
Density: 25.1 pcf
Thickness: 0.66 inch
Breaking Load: 34.0 lbs./3 inch width
Modulus of Rupture: 236 psi

EXAMPLE 51

This example demonstrates that organic fibers can be used as well as mineral fibers. The following ingredients were combined under high shear mixing to form a binder system:
0.3% sodium hexametaphosphate
0.1% hydroxy propyl cellulose/methyl cellulose 7.0% magnesium chloride added in the form of hexahydrate flake
54.86% water
0.04% polyethylene oxide
14.9% magnesium oxide
0.2% sodium lauryl sulfate as a 30% solution
0.2% Makon 10

The system was froth foamed and thereafter 7.5% fibrous wollastonite and 14.9% wood pulp fiber was admixed with the foam. A board was formed and was allowed to cure at room temperature. The final composition of the board was:

| ingredients | percent |
| --- | --- |
| combined water | 27.74 |
| wood fiber | 24 |
| magnesium oxide | 24 |
| fibrous wollastonite | 12 |
| magnesium chloride | 11 |
| sodium hexametaphosphate | 0.5 |
| sodium lauryl sulfate | 0.3 |
| alkyl phenol ether | 0.2 |
| hydroxy propyl cellulose/ methyl cellulose | 0.2 |
| polyethylene oxide | 0.06 |

The board's physical properties were measured and were found to be as follows:
Density: 24.5 pcf
Thickness: 0.66 inch
Breaking Load: 23.6 lbs./3 inch width
Modulus of Rupture: 163 psi

EXAMPLE 52

This example demonstrates the use of gypsum and clay as fillers. The following ingredients were combined under high shear mixing to form a binder system:
0.6% sodium hexametaphosphate
0.2% hydroxy propyl cellulose/methyl cellulose as a 2% solution
5.4% magnesium chloride as a 33.76% solution
35.8% water
11.5% magnesium oxide
0.1% polyethylene oxide
7.7% gypsum
7.7% clay
0.2% sodium lauryl sulfate as a 30% solution
0.2% Makon 10

The system was froth foamed and was thereafter admixed with 11.5% fibrous wollastonite and 19.1% slag wool. A board was formed and cured for 3 days at room temperature. The final composition of the board was as follows:

| ingredients | percent |
| --- | --- |
| slag wool | 25 |
| combined water | 16.4 |
| fibrous wollastonite | 15 |
| magnesium oxide | 15 |
| gypsum | 10 |
| clay | 10 |
| magnesium chloride | 7 |
| sodium hexametaphosphate | 0.7 |
| sodium lauryl sulfate | 0.3 |
| hydroxy propyl cellulose/ methyl cellulose | 0.25 |
| alkyl phenol ether | 0.25 |
| polyethylene oxide | 0.1 |

The physical properties of the board were measured and were found to be as follows:
Density: 33.9 pcf
Thickness: 0.69 inch
Breaking Load: 29 lbs./3 inch width
Modulus of Rupture: 183 psi

EXAMPLE 53

This example shows that sodium polysilicate can be used as the binder and that a portion of the fibers can be admixed with the binder system prior to foaming. The following ingredients were combined under high shear mixing to form a binder system:
31.6% sodium polysilicate as a 39% solution
3.0% high aspect ratio fibrous wollastonite
0.3% sodium lauryl sulfate as a 30% solution
0.1% amine oxide as a 30% solution
50.2% water The system was froth foamed and thereafter 14.8% slag wool was admixed with the foam. A board was formed and was processed until dry at 250° F. The final composition of the board was as follows:

| ingredients | percent |
| --- | --- |
| sodium polysilicate | 63.3 |
| slag wool | 30 |
| high aspect ratio fibrous wollastonite | 6 |
| sodium lauryl sulfate | 0.5 |
| amine oxide | 0.2 |

The physical properties of the board were measured and were found to be as follows:
Density: 17.1 pcf
Thickness: 0.93 inch
Breaking Load: 21.7 lbs./3 inch width
Modulus of Rupture: 75 psi

EXAMPLE 54

This example demonstrates that the binding system can include both organic and inorganic binders. The following ingredients were combined to form a binder system:
7.8% modified starch as a 22.8% solution
1.1% magnesium chloride as a 35% solution
0.5% sodium lauryl sulfate as a 30% solution
0.6% Makon 10
0.1% amine oxide added as a 30% solution
48.6% water
2.3% magnesium oxide
0.1% polyethylene oxide
10.5% clay The system was froth foamed and was subsequently combined with 5.1% high aspect ratio fibrous wollastonite and 23.3% slag wool. A board was formed and the board was processed at 250° F. until dry. The final composition of the board is as follows:

| ingredients | percent |
| --- | --- |
| slag wool | 44 |
| clay | 20 |
| modified starch | 15 |
| fibrous wollastonite | 10 |
| magnesium oxide | 4 |
| combined water | 2.6 |
| magnesium chloride | 2 |
| alkyl phenol ether | 1 |
| sodium lauryl sulfate | 1 |

| ingredients | percent |
| --- | --- |
| polyethylene oxide | 0.2 |
| amine oxide | 0.2 |

Physical properties of the board were measured and were found to be as follows:
Density: 17.7 pcf
Thickness: 0.72 inch
Breaking Load: 20.7 lbs./3 inch width
Modulus of Rupture: 120 psi

EXAMPLE 55

The following ingredients were combined under high shear mixing to form a binder system:
36.2% water
0.7% polyvinyl alcohol as a 4% solution
0.4% sodium hexametaphosphate
9.8% magnesium chloride as a 35% solution
20.4% magnesium oxide
0.2% sodium lauryl sulfate as a 30% solution
0.2% amine oxide as a 30% solution The system was froth foamed and 27.0% fibrous wollastonite and 5.1% slag wool were admixed with the foam. A board was formed and cured for 15 hours at room temperature followed by 2 hours at 200° F. The final composition of the board was:

| ingredients | percent |
| --- | --- |
| fibrous wollastonite | 30.4 |
| combined water | 26.8 |
| magnesium oxide | 23.9 |
| magnesium chloride | 11 |
| slag wool | 6 |
| polyvinyl alcohol | 0.8 |
| sodium hexametaphosphate | 0.5 |
| sodium lauryl sulfate | 0.3 |
| amine oxide | 0.3 |

The physical properties of the board were measured and were found to be as follows:
Density: 21.3 pcf
Thickness: 0.68 inch
Breaking Load: 37 lbs./3 inch width
Modulus of Rupture: 254 psi

EXAMPLE 56

The following ingredients were combined under high shear mixing to form a binder system:
2.2% P-270 starch
0.4% sodium hexametaphosphate
9.8% magnesium chloride as a 35% solution
0.2% sodium lauryl sulfate as a 30% solution
0.2% amine oxide as a 30% solution
36.2% water
20.4% magnesium oxide The system was froth foamed and 25.5% fibrous wollastonite and 5.1% slag wool were subsequently admixed with the foam. A board was formed and cured for 15 hours at room temperature followed by 2 hours at 200° F. The final composition of the board was as follows:

| ingredients | percent |
| --- | --- |
| fibrous wollastonite | 28.3 |
| combined water | 26.8 |
| slag wool | 6 |
| magnesium oxide | 23.9 |
| magnesium chloride | 10.9 |
| P-270 starch | 3 |
| sodium hexametaphosphate | 0.5 |
| sodium lauryl sulfate | 0.3 |
| amine oxide | 0.3 |

The physical properties of the board were measured and were found to be as follows:
Density: 16.4 pcf
Thickness: 0.71 inch
Breaking Load: 25.0 lbs./3 inch width
Modulus of Rupture: 149 psi

EXAMPLE 57

The following ingredients were combined with high shear mixing to form a binding system:
7.9% magnesium chloride as a 35% solution
35.37% water
0.2% sodium hexametaphosphate
0.1% J-75MS as a 2% solution
0.03% Z-6020 silane
0.3% Textamine Oxide as a 30% solution
0.3% Makon 10
16.6% magnesium oxide The system was froth foamed and 18.1% low aspect ratio wollastonite, 18.1% high aspect ratio fibrous wollastonite and 3% ¼" glass fibers were mixed with the foam. A board was formed and was processed for 50 minutes: 35 minutes at 120°–145° F., 10 minutes at 200°–225° F., 1 minute of radio frequency and 4 minutes at 300° F. The final composition of the resulting board was as follows:

| ingredients | percent | |
| --- | --- | --- |
| fibrous wollastonite | | 46 |
| high aspect ratio | 23% | |
| low aspect ratio | 23% | |
| ¼" glass fibers | | 3.8 |
| magnesium oxide | | 21.1 |
| magnesium chloride | | 10 |
| combined water | | 17.86 |
| alkyl phenol ether | | 0.4 |
| amine oxide | | 0.4 |
| sodium hexametaphosphate | | 0.3 |
| hydroxy propyl cellulose/ methyl cellulose | | 0.1 |
| amino silane | | 0.04 |

The physical properties of the board were measured and found to be as follows:
Density: 19 pcf
Thickness: 0.65 inch
Breaking Load: 32 lbs./3 inch width
Modulus of Rupture: 228 psi It will be understood that the above examples are merely exemplary of the process of the present invention and that the process can be used with other materials and can be used to form a variety of shaped fibrous objects. It will therefore be understood that the claims are intended to cover all changes and modifications of the preferred embodiment of the invention herein chosen for the purpose of illustration which do not constitute departures from the spirit and scope of the invention.

What is claimed is:

1. A method of manufacturing a shaped fibrous product from an aqueous composition comprising the following ingredients by weight of solids content:
   fibers: 25–95%
   binder: 5–75%
   clay: 0–40%
   gypsum: 0–15%
   foaming agent: 0.1–5%
said method comprising the successive steps of:
   (a) preparing an aqueous admixture by admixing the binder and the foaming agent with water, the water being present in the amount of from about 25% to about 70% by weight of the furnish composition;
   (b) combining said aqueous admixture under agitation with air to form an aqueous foamed binder system, the amount of surfactant in combination with the degree of agitation being sufficient so that said air is present in the amount of from about 30% to about 90% by volume of the aqueous foamed binder system;
   (c) combining said fibers with said aqueous foamed binder system to form a foamed furnish composition, said foamed composition being a slurry of said fibrous materials in said aqueous foamed binder system;
   (d) forming a shaped product from said foamed furnish composition; and
   (e) setting the shaped product.

2. The method of claim 1 wherein the foamed composition comprises from about 60% to about 75% gas by volume of the foamed composition.

3. The method of claim 1 wherein the gas is air.

4. The method of claim 1 wherein the fibrous material comprises from about 40% to about 70% by weight of the solids content of the foamed composition.

5. The method of claim 4 wherein the fibrous material comprises fibers having an average diameter of from about 1 micron to about 25 mils.

6. The method of claim 5 wherein the average diameter not greater than about 5 mils.

7. The method of claim 5 wherein the average length of the fibers is from at least about 1/64 inch.

8. The method of claim 7 wherein the average fiber length is no greater than about 2 inches.

9. The method of claim 5 wherein the fibers have an aspect ratio of at least about 10:1.

10. The method of claim 1 wherein the fibrous material comprises organic fibers.

11. The method of claim 10 wherein the organic fibers are selected from the group consisting of cellulose fibers, wood fibers, polyester fibers, polyolefin fibers, polyamide fibers and combinations of the foregoing.

12. The method of claim 1 wherein the fibrous material comprises mineral fibers.

13. The method of claim 12 wherein the mineral fibers are selected from the group consisting of mineral wool, rock wool, slag wool, wollastonite, kaolin, glass wool, glass fibers and combinations of the foregoing.

14. The method of claim 13 wherein the fibers consist essentially of rock wool, slag wool, glass fibers, high aspect ratio wollastonite and mixtures of the foregoing.

15. The method of claim 1 wherein the fibrous material comprises a mixture of organic and inorganic fibers.

16. The method of claim 1 wherein the foaming agent is a surfactant.

17. The method of claim 16 wherein the surfactant is selected from the group consisting of anionic, cationic and amphoteric surfactants and combinations of the same but not including combinations of anionic surfactants with cationic surfactants.

18. The method of claim 1 wherein the binder system includes a silane coupling agent.

19. The method of claim 18 wherein the silane coupling agent is present in an amount up to about 0.3%.

20. The method of claim 18 wherein the silane coupling agent is present in an amount up to about 0.2%.

21. The method of claim 18 wherein the silane coupling agent is present in an amount up to about 0.1%.

22. The method of claim 1 wherein the foamed composition includes polyethylene oxide.

23. The method of claim 22 wherein the polyethylene oxide is present in an amount up to about 0.5% by weight of the solids content of the foamed composition.

24. The method of claim 22 wherein the polyethylene oxide is present in an amount up to about 0.3% by weight of the solids content of the foamed composition.

25. The method of claim 22 wherein the polyethylene oxide is present in an amount up to about 0.1% by weight of the solids content of the foamed composition.

26. The method of claim 1 wherein the binder system includes a thickening agent.

27. The method of claim 26 wherein the thickening agent is present in sufficient amount to bring the viscosity of the aqueous solution above about 1500 centipoises.

28. The method of claim 26 wherein the thickening agent is selected from the group consisting of methyl cellulose, hydroxy propyl cellulose and mixtures thereof.

29. The method of claim 26 wherein the thickening agent is present in the amount of from about 0.1% to about 0.5% by weight of the solids content of the foamed composition.

30. The method of claim 1 wherein the aqueous solution includes a dispersing agent.

31. The method of claim 30 wherein the dispersing agent is sodium hexametaphosphate.

32. The method of claim 30 wherein the dispersing agent is present in the amount of up to about 1% by weight of the solids content of the foamed composition.

33. The method of claim 1 wherein the foaming agent is present in the amount of from about 0.1% to about 5% by weight of the solids content of the foamed composition.

34. The method of claim 33 wherein the foaming agent is present in the amount of from about 0.3% to about 3% by weight of the solids content of the foamed composition.

35. The method of claim 33 wherein the foaming agent is present in the amount of from about 0.3% to about 1.5% by weight of the solids content of the foamed composition.

36. The method of claim 1 wherein the aqueous solution includes a foam stabilizer.

37. The method of claim 36 wherein the foam stabilizer is a non-ionic surfactant.

38. The method of claim 36 wherein the foam stabilizer is present in an amount up to about 1.0%.

39. The method of claim 36 wherein the foam stabilizer is present in an amount up to about 0.7%.

40. The method of claim 1 wherein the foamed composition further comprises ingredients selected from the group consisting of dyes, pigments, antioxidants, water repellents, fillers, fire retardants and combinations of the foregoing.

41. The method of claim 1 wherein the binder is an organic material.

42. The method of claim 41 wherein the binder is selected from the group consisting of starches, modified starches, latexes and combinations of the foregoing.

43. The method of claim 42 wherein the modified starch is an oxidized, ethoxylated starch.

44. The method of claim 42 wherein the latex is selected from the group consisting of polyvinyl acetate, vinyl acetate/acrylic copolymers and styrene-butadiene.

45. The method of claim 41 wherein the binder is present in the amount of from about 5% to about 50% by weight of the solids content of the foamed composition.

46. The method of claim 41 wherein the binder is present in the amount of from about 10% to about 35% by weight of the solids content of the foamed composition.

47. The method of claim 41 wherein the water content of the foamed composition is from about 30% to about 60%.

48. The method of claim 41 wherein the foamed binder system includes at least one binding filler.

49. The method of claim 48 wherein the binding filler is selected from the group consisting of clay, gypsum, and mixtures of clay and gypsum.

50. The method of claim 49 wherein the clay is present in an amount of up to about 40%.

51. The method of claim 49 wherein the clay is present in an amount of up to about 30%.

52. The method of claim 49 wherein the clay is present in an amount of up to about 20%.

53. The method of claim 49 wherein the gypsum is present in an amount up to about 15%.

54. The method of claim 49 wherein the gypsum is present in an amount up to about 10%.

55. The method of claim 41 wherein the solids content of the foamed composition comprises from about 25% to about 90% mineral fibers, from about 5% to about 30% of a binder selected from the group consisting of starches and latexes, and combinations of starches and latexes, up to about 40% clay, up to about 15% gypsum, and from about 0.5% to about 2% surfactant.

56. The method of claim 55 wherein the clay is present in the amount of at least about 10% and the gypsum is present in the amount of at least about 5%.

57. The method of claim 1 wherein the binder is an inorganic material.

58. The method of claim 57 wherein the inorganic binder is selected from the group consisting of gypsum, silicates, hydraulic cement and Sorel cements.

59. The method of claim 58 wherein the hydraulic cement is Portland cement.

60. The method of claim 58 wherein the Sorel cement is magnesium oxychloride.

61. The method of claim 57 wherein the binder is present in the amount of from about 30% to about 70% by weight of the solids content of the foamed composition.

62. The method of claim 57 wherein the binder is present in the amount of from about 40% to about 65% by weight of the solids content of the foamed composition.

63. The method of claim 57 wherein the water content of the foamed composition is from about 30% to about 50%.

64. The method of claim 57 wherein the water content of the foamed composition is from about 30% to about 40%.

65. The method of claim 1 wherein the binder includes magnesium oxide, and a phosphate compound or combination of phosphate compounds is present in an amount up to about 1% by weight of the solids content of the foamed composition.

66. The method of claim 57 wherein the foamed composition comprises from about 25% to about 70% mineral fibers and from about 30% to about 75% of a binder selected from the group consisting of cements and silicates.

67. The method of claim 66 further including a thickening agent in an amount sufficient to raise the viscosity of the aqueous solution above about 1500 centipoises.

68. The method of claim 1 wherein the binder comprises at least one organic material and at least one inorganic material.

69. The method of claim 1 wherein the gypsum, if present, is admixed with the foamed binding system at the same time as the fibrous material.

70. A method of manufacturing an acoustical ceiling board from an aqueous furnish composition comprising the following ingredients by weight of solids content:
mineral fibers: 25–90%
starch/latex binder: 5–30%
clay: 0–40%
gypsum: 0–15%
surfactant: 0.5–2%
said method comprising the successive steps of:
(a) preparing an aqueous admixture by admixing the binder and the foaming agent with water, the water being present in the amount of from about 30% to about 60% by weight of the furnish composition;
(b) combining said aqueous admixture under agitation with air to form an aqueous foamed binder system, the amount of surfactant in combination with the degree of agitation being sufficient so that said air is present in the amount of from about 60% to about 75% by volume of the aqueous foamed binder system;
(c) combining said mineral fibers with said aqueous foamed binder system to form a foamed furnish composition; said foamed composition being a slurry of said fibrous materials in said aqueous foamed binder system;
(d) forming a ceiling board from said foamed furnish composition; and
(e) drying the ceiling board to a moisture content below about 3% by weight of the board.

71. The method of claim 70 wherein the gypsum is present in the amount of at least about 5%.

72. The method of claim 71 wherein the gypsum and the mineral fibers are simultaneously combined with the foamed binder system.

73. The method of claim 70 wherein the clay is present in an amount of at least about 10%.

74. A method of manufacturing an acoustical ceiling board from an aqueous furnish composition comprising the following ingredients by weight of solids content:
mineral fibers: 25–70%
cement binder: 30–75%
surfactant: 0.1–1.5%
said method comprising the successive steps of:
(a) preparing an aqueous admixture by admixing the binder and the foaming agent with water, the water being present in the amount of from about 30% to about 50% by weight of the furnish composition;

(b) combining said aqueous admixture under agitation with air to form an aqueous foamed binder system, the amount of srufactant in combination with the degree of agitation being sufficient so that said air is present in the amount of from about 60% to about 75% by volume of the aqueous foamed binder system;

(c) combining said mineral fibers with said aqueous foamed binder system to form a foamed furnish composition, said foamed composition being a slurry of said fibrous material in said aqueous foamed binder system.

75. The method of claim 74 wherein the ingredients further include a thickening agent in the amount of 0.1-0.5% by weight of solids content and the thickening agent is included in the aqueous admixture of sub-part (a).

76. The method of claim 75 wherein the thickening agent is present in sufficient amount to bring the viscosity of the aqueous admixture above about 1500 cps on a Brookfield viscometer operated at 25° C. with spindle #4 rotating at 60 rpm.

77. The method of claim 74 wherein the mineral fibers consist essentially of about 2-6% glass fibers with the remainder being wollastonite.

78. The method of claim 74 wherein the drying is effected at ambient temperature.

79. The method of claim 74 wherein the drying includes radio frequency treatment.

80. The method of claim 79 wherein the radio frequency treatment is between two heating steps.

81. The method of claim 80 wherein drying is effected by the successive steps of:

(a) heating at about 200°-275° F. for about 10-25 minutes;

(b) radio frequency treatment for about 1 to 2 minutes at a peak power of about 0.5 to about 1 watt per square centimeter; and (c) heating at about 250°-350° F. for about 1-3 minutes.

82. A shaped fibrous product made by the method of claim 1.

83. A shaped fibrous product made by the method of claim 55.

84. A shaped fibrous product made by the method of claim 56.

85. A shaped fibrous product made by the method of claim 66.

86. An acoustical ceiling board made by the method of claim 70.

87. An acoustical ceiling board made by the method of claim 74.

88. An acoustical ceiling board made by the method of claim 77.

89. An acoustical ceiling board made by the method of claim 81.

* * * * *

UNITED STATES PATENT AND TRADEMARK OFFICE
CERTIFICATE OF CORRECTION

PATENT NO. : 4,613,627

DATED : September 23, 1986

INVENTOR(S) : Norman Sherman et al.

It is certified that error appears in the above-identified patent and that said Letters Patent is hereby corrected as shown below:

Column 13, line 14, "4.8% water" should be --44.8% water--.

Column 17, line 25, "3.11% water" should be --33.11% water--.

Column 20, line 7, after "for" insert --7--.

Column 29, claim 1, line 2, after "aqueous" insert --furnish--.

Signed and Sealed this

Twenty-fourth Day of March, 1987

Attest:

DONALD J. QUIGG

Attesting Officer

Commissioner of Patents and Trademarks